United States Patent [19]

Noda et al.

[11] 4,117,169

[45] Sep. 26, 1978

[54] PROCESS FOR PRODUCING FERMENTED LIQUID FOOD PRODUCTS

[75] Inventors: Fumio Noda, Kamagaya; Keitaro Mogi; Toshio Sakasai, both of Noda, all of Japan

[73] Assignee: Kikkoman Shoyu Co. Ltd., Japan

[21] Appl. No.: 809,701

[22] Filed: Jun. 24, 1977

[30] Foreign Application Priority Data

Jun. 30, 1976 [JP] Japan .................................. 51-76541

[51] Int. Cl.² .......................... A23L 1/20; A23L 1/10; A23L 1/238

[52] U.S. Cl. .......................................... 426/7; 426/9; 426/11; 426/18; 426/31; 426/46; 426/52; 426/589; 426/592

[58] Field of Search ....................... 426/11, 18, 25, 31, 426/46, 52, 7, 9, 589, 592

[56] References Cited

U.S. PATENT DOCUMENTS

| | | | |
|---|---|---|---|
| 3,839,930 | 8/1974 | Sakasai et al. | 426/46 |
| 3,937,844 | 2/1976 | Koyama | 426/46 |
| 4,028,470 | 6/1977 | Hayashi et al. | 426/52 X |
| 4,046,921 | 9/1977 | Akao et al. | 426/46 |

OTHER PUBLICATIONS

Furia, T. E., "Handbook of Food Additives", The Chemical Rubber Co., Cleveland, Ohio, pp. 159–160.

*Primary Examiner*—Robert A. Yoncoskie
*Attorney, Agent, or Firm*—Sherman & Shalloway

[57] ABSTRACT

In a process for producing a fermented liquid food product by fermenting a moromi which comprises a koji for the fermented liquid food product, a moromi substrate and a liquid such as brine, alcohol and water at a temperature of about 10° to about 40° C for a time sufficient to produce the fermented liquid food product; the improvement wherein the fermentation is carried out in the presence of about 0.05 to about 10% by weight, based on the total weight of the koji and moromi substrate, of an added metal salt selected from the group consisting of potassium salts, sodium salts, calcium salts and magnesium salts of aliphatic carboxylic acids containing up to 4 carbon atoms.

9 Claims, No Drawings

PROCESS FOR PRODUCING FERMENTED LIQUID FOOD PRODUCTS

This invention relates to a process for producing fermented liquid food products such as soy sauce, mirin and sake (Japanese wine from rice). Particularly, the invention relates to an improved process for producing fermented liquid food products, which makes it possible to inhibit the growth of contaminating bacteria that adversely affect the quality of "moromi", shorten the fermentation period, to perform fermentation at low sodium chloride concentrations so as to provide soy sauce of low sodium chloride content, increase the ratio of nitrogen utilization of the moromi substrate, and to provide fermented liquid food products having superior flavor and quality.

It is known to produce fermented liquid food products by fermenting (or brewing) a "moromi" which comprises a koji for fermented liquid food products, a moromi substrate and a liquid such as brine, alcohol and water at a temperature of about 10° to 40° C. for a time sufficient to produce the fermented liquid food products.

In the production of fermented liquid food products such as soy sauce, sake or mirin by fermentation of moromi, considerations have been given to the shortening of the fermentation period and the increasing of the ratio of utilization of the moromi substrate. In fact, the fermentation period is long and the ratio of utilization of the moromi substrate is low in fermentation at high sodium chloride concentrations as in the case of producing soy sauce or in fermentation at low pH as in the production of sake or mirin because the activities of enzymes, such as protease or amylase, which are secreted by the koji mold and other useful microorganisms, are strongly hampered. It has been much desired therefore to overcome this disadvantage.

Japanese Pat. No. 36,272 (patented in 1920) discloses an attempt to shorten the period of fermentation of moromi for soy sauce which comprises adding a water-insoluble alkaline earth metal compound of a weak acid, such as calcium carbonate, to the fermentation system after the end of alcoholic fermentation to render the system nearly neutral and to promote the decomposition of proteins in the moromi substrate. It was suggested in Japanese patent publication No. 6645/1958 that in the fermentation of moromi for soy sauce, an alkali or an alkali salt, such as potassium hydroxide, sodium hydroxide, ammonia, potassium carbonate, slaked lime, or urea, is added to moromi at the early stage of the fermenting period to adjust the pH of the system to 5.5–10. These prior techniques are based on the common idea of shortening the fermentation period, and suggest the adjustment of the pH to the fermentation system to neutrality or weak acidity or weak alkalinity by using specific additives. But no consideration was given to the inhibition of contaminating bacteria which would adversely affect the quality of moromi and the resulting fermented liquid food products.

Moromi used to produce fermented liquid food products such as soy sauce, mirin and sake contains large quantities of proteins and carbohydrates, and since moromi is fermented in an open system not shielded from the atmospheric air, the contaminating bacteria are prone to grow in the fermentation system. Abnormal growth of the bacteria such as acetic acid bacteria and lactic bacteria will spoil the moromi and the resulting fermented liquid food products. Once the moromi has been contaminated by the bacteria, it is very difficult to inhibit their growth.

On the other hand, it is known that in the production of miso, a fermented solid food product, by fermenting a starting material consisting of a koji for miso and a miso substrate, acetic acid or an acetic acid salt is added to the starting material during or after the feeding of the materials into the fermentation system in order to increase the formation of an acetic acid ester which is a flavoring ingredient of miso (Japanese Laid-Open patent publication No. 95495/75). This patent publication is limited to the production of the fermented solid food product, and does not at all state anything about fermented liquid food products such as soy sauce, mirin or sake. It neither describes the inhibition of contaminating bacteria which adversely affect the quality of miso, let alone the inhibition of the growth of contaminating bacteria which would adversely affect the quality of fermented liquid food products. Moreover, the amount of the acetate recommended in this publication is less than 100 ppm, especially up to as small as 10 ppm.

The coinventors of the present application previously found that in the production of koji for fermented food products such as soy sauce, miso, mirin and sake, the growth of contaminating bacteria which adversely affect the quality of the koji can be inhibited by causing a sodium or potassium salt of an aliphatic carboxylic acid containing up to 4 carbon atoms to be present in the koji substrate preferably in the early stage of koji production, and disclosed it in U.S. patent application Ser. No. 790,870 (filed Apr. 26, 1977). The salt used in the production of koji for fermented food products is assimilated by the koji mold, and does not substantially remain in koji as a final product. Hence, when fermented food products are produced by preparing moromi using such koji, and fermenting it, the koji does not serve to inhibit the undesirable growth of contaminating bacteria which occur during the fermentation and adversely affect the quality of moromi and fermented liquid food products. Since in the fermentation of moromi, different microorganisms from those which occur in the fermentation of koji greatly affect the quality of moromi and the final fermented product, it is impossible to anticipate the action of the aforesaid salts in the fermentation of moromi from the action of the aforesaid salts on contaminating bacteria in the production of koji. For example, in addition to the contaminating bacteria of the genus Bacillus and non-salt resistant contaminating bacteria of the genus Micrococcus which cause the troubles in the fermentation of koji for soy sauce, salt-resistant and acid-resistant contaminating bacteria of the genus Micrococcus and salt-resistance and acid-resistant contaminating bacteria of the genus Streptococcus become a cause of troubles in the fermentation of moromi for soy sauce. Furthermore, in addition to contaminating bacteria of the genus Bacillus and non-acid resistant and non-alcohol resistant contaminating bacteria of the genus Micrococcus which causes troubles in the fermentation of koji for mirin or sake, contaminating bacteria of the genus Bacterium and contaminating bacteria of the genus Leuconostoc also pose a problem in the fermentation of moromi for mirin and sake.

We have made extensive investigations in an attempt to overcome the troubles associated with the growth of contaminating bacteria in the production of fermented liquid food products using moromi, shorten the fermentation period, perform fermentation at low sodium chloride concentrations, increase the ratio of utilization of the moromi substrate, and thus to provide fermented liquid food products of superior flavor and quality. These investigations led to the discovery that the improvements can be achieved by fermenting moromi for fermented liquid food products in the presence of about 0.05 to about 10% by weight, based on the total weight of koji for fermented liquid food products and a moromi substrate, of an added metal salt selected from the group consisting of potassium, sodium, calcium and magnesium salts of aliphatic carboxylic acid containing up to 4 carbon atoms.

Accordingly, it is an object of this invention to provide an improved process for producing fermented liquid food products such as soy sauce, mirin and sake.

The above and other objects and advantages will become apparent from the following description.

The fermented liquid food products to be produced by the process of this invention include various types of soy sauce such as those produced by conventional fermentation methods (e.g., deep-colored soy sauce, light-colored soy cauce, non-colored soy cauce, *tamari* soy sauce, semi-chemical semi-fermented soy sauce) and soy sauce-like seasoning liquids obtained by hydrolyzing starch materials and protein materials with enzymes or acids; various types of sake produced by conventional fermenting methods for sake; and various types of mirin produced by conventional fermenting methods for mirin.

In the process of this invention, one or more of the metal salts selected from the group consisting of potassium, sodium, calcium, and magnesium salts of aliphatic carboxylic acids containing up to 4 carbon atoms can be used. Specific examples of the metal salts include sodium salts such as sodium formate, sodium acetate, sodium propionate and sodium butyrate; potassium salts such as potassium formate, potassium acetate, potassium propionate and potassium butyrate; magnesium salts such as magnesium formate, magnesium acetate, magnesium propionate and magnesium butyrate; and calcium salts such as calcium formate, calcium acetate, calcium propionate and calcium butyrate. The use of sodium acetate, potassium acetate, sodium propionate, and potassium propionate is preferred.

One or more of the metal salts, which are sometimes referred to as additives of the invention, may be added at a time or in portions. The metal salts may be used in powder form. Since they are soluble in water and hydrous alcohols, they may also be added in the form of solutions in these solvents.

When the time required for the metal salt added to be completely assimilated by useful yeasts or lactic bacteria in the moromi is considered, the metal salt may be added at any time after the completion of koji production until an appropriate stage in the fermentation of the moromi is reached. Usually, it is preferred to add it to the produced koji, the charged liquid or to the moromi in the early stage of the fermenting period.

The amount of the metal salt varies somewhat according to the type of the fermented liquid food product to be produced. Usually, it is at least about 0.05% by weight, especially about 0.05 to about 10% by weight, based on the total weight of the raw materials charged (consisting of koji for fermented liquid food products and a moromi substrate such as heat sterilized or steam-modified grains; excluding the liquid charged). Addition of the metal salt in an amount of at least about 0.05% by weight based on the total weight of the charged raw materials results in the adjustment of the pH of moromi to a certain fixed value, for example 6.5–3.5, preferably 6.0–4.0, because of the strong buffering action of the metal salt. Accordingly, the enzyme system secreted by the koji mold or useful microorganisms acts very well on the moromi substrate, and decomposes the raw materials very rapidly and strongly. As a result, the fermentation period is much shortened, and the ratio of utilization of the raw materials increases. It has been found surprisingly that the added metal salt completely inhibits the growth and activity of spoiling bacteria which enter the fermentation system, but does not exert any substantial inhibiting action on the growth and activity of useful yeasts and bacteria; and therefore that the fermentation can be performed in good condition to afford final fermented products having very good taste and flavor.

The amount of the metal salt can be varied according to the type of the fermented liquid food product. For soy sauce, the amount is about 0.05 to 10% by weight, preferably about 0.1 to 5% by weight, based on the total weight of the koji and the moromi substrate; and for sake and mirin, the amount is about 0.05 to 8% by weight, preferably about 0.1 to about 3% by weight, based on the total weight of the koji and moromi substrate.

Proteinaceous materials and carbohydrate materials can be utilized as the moromi substrate for soy sauce. Generally, they are used after being modified by conventional modifying means.

Starch materials can be utilized as the moromi substrate for sake or mirin. These materials are usually employed after being modified by conventional modifying means.

The proteinaceous materials used as the moromi substrate include, for example, vegetable protein materials of the soybean and wheat origins, such as soybean, defatted soybean, dehulled soybean or gluten, and fish protein materials such as fish meal. The carbohydrate materials used as the moromi substrate include, for example, rice, barley, corn, oats, wheat, wheat bran, sake lees, and rice bran. If desired, these materials can be used as mixtures.

There are various conventional modifying means for the moromi substrates. For example, a method of steaming treatment can be used in which water is added to an unmodified moromi substrate or its raw materials, and the mixture is heated with saturated steam at atmospheric or elevated pressures, followed by cooling the product spontaneously or rapidly. It is also possible to employ a method of roasting treatment wherein the materials are dry-heated at high temperatures either directly or after adding water; and a method of puffing treatment wherein with or without adding water, the materials are heat-treated with saturated steam or superheated steam at high temperatures, and the product is then rapidly released into the atmosphere at a lower pressure. The steaming, puffing and roasting treatments cited above are especially suitable for use in the present invention.

According to the process of this invention, moromi containing a koji for a fermented liquid food product, a moromi substrate (which may contain sodium chloride in the case of producing soy sauce) and a liquid are charged into a fermentation zone such as a tank, and fermented at a temperature of about 10° to 40° C. for a time sufficient to produce the fermented liquid food product. Since the process of the invention can advantageously inhibit the growth of contaminating bacteria that adversely affect the quality of moromi, the fermentation for production of soy sauce, for example, can be performed in the absence of sodium chloride or at low sodium chloride concentrations of, say, up to about 20% by weight based on the moromi. The pH of the fermentation system is about 6.5 to 5.0 in the case of soy sauce, about 4.5 to 3.5 in the case of sake, and about 5.0 to 4.0 in the case of mirin. The period of fermentation is about 90 to 120 days for soy sauce, about 15 to 21 days for sake, and about 40 to 50 days for mirin.

After the fermentation, the solids are removed, and if desired, the residue is heated and cooled, to form a final product such as soy sauce, sake or mirin.

The specific metal salt added to moromi in the process of this invention does not affect the taste of the final products nor does it cause any sanitary troubles because it is completely assimilated by yeasts, lactic bacteria and other microorganisms during the fermentation of the moromi.

The following Experiments illustrate the amounts and effects of the metal salts additives used in this invention.

EXPERIMENT 1

Many lots were prepared which consisted of 800 g of a koji for soy sauce prepared by a conventional method. Then, 1300 ml of a 22% sodium chloride solution having dissolved therein each of the additives indicated in Table 1 in the amounts indicated was mixed with each lot of koji. Then, 10 ml of a suspension (the number of raw living cells $5 \times 10^9$/ml) of spoiling bacteria (bacterium amarum) separated from the spoiled soy sauce moromi was added to the mixture. The mixture was subjected to a usual control of moromi production at 30° C. for 150 days, and squeezed. The nitrogen utilization ratio and the ingredients of each of the resulting liquids were determined, and the liquids were also subjected to a sensory test. Furthermore, the time required until moromi liquids having substantially the same ingredient analysis values as the moromi liquid of the control lot (after 150 days from charging) were obtained was determined. The results are shown in Table 1.

The moromi liquid obtained from the control lot was prepared by mixing 800 g of a koji for soy sauce with 1300 ml of a 22% sodium chloride solution not containing the spoiling bacteria mentioned above, subjecting the mixture to a usual control of moromi production at 30° C. for 150 days, and squeezing the resulting moromi.

It is seen from the results obtained that the moromi liquids from lot No. 1 to which a suspension of the spoiling bacteria was added in the absence of the metal salt additive, lots Nos. 2, 9, 16 and 23 to which 0.01% of the metal salt additive was added, and lots Nos. 30 and 31 to which a suspension of the spoiling bacteria was added in the presence of sodium carbonate were all spoiled, and the flavors of the moromi liquids were markedly deteriorated.

It can also be found that in lot No. 31 to which 5% of sodium carbonate was added, the total ratio of nitrogen utilization increased by as much as 3%, but since sodium carbonate had no power of inhibiting the growth of contaminating bacteria, the moromi contaminated with these bacteria was spoiled and its flavor was markedly deteriorated.

On the other hand, in the case of the lots to which at least 0.05% of the metal salt additive was added, moromi was not spoiled at all even when contaminated with the spoiling bacteria, and the fermentation period was shortened to 90 to 120 days. Furthermore, the ratio of utilization of nitrogen increased by 3.3 to 4.7%, and the amount of glutamic acid also increased markedly. Hence, soy sauce of very good taste and flavor could be obtained.

The ingredient analysis was performed by the method described in a Japanese-language publication entitled "Method for Analyzing Fermentation Products" (Shoichi Yamada, Sangyo Tosho Press Co., Ltd.).

The ratio of nitrogen utilization is the percentage of dissolved nitrogen based on total nitrogen in the soy sauce-making raw materials.

The ratio of sugar utilization is the percentage of dissolved sugar based on total reducing sugar in the raw materials for fermented liquid foods.

In the sensory test, the taste of each of the moromi liquids in lots No. 1 to 31 was compared with that of the moromi liquid in the control lot (conventional method). The results were rated on a scale of 0 (not difference), 1 (some difference), 2 (large difference), and 3 (very large difference). When the moromi had a better flavor than the moromi of the control lot, the sign (+) was attached. The sign (−) thus shows that the flavor was inferior to the flavor of the moromi liquid in the control lot. These ratings were averages of the results obtained by a panel of 20 well-trained specialists having differentiating ability. The sign (*) in the column headed "Value" shows that the difference was significant at 5% level; the sign (**) shows that the difference was significant at 1% level; and the sign (−) shows that the difference was not significant.

Through the following Experiments and Examples, the ratio of nitrogen or sugar utilization, the ingredient analysis of the moromi liquid, and the sensory test were performed by the same methods described above.

Table 1

| Lot | Additive | Concentration (%) | NaCl | Total nitrogen | Glutamic acid | Reducing sugar | Alcohol | Ratio of nitrogen utilization (%) | Sensory test Rating | Sensory test Value | Fermentation period (days) |
|---|---|---|---|---|---|---|---|---|---|---|---|
| Control | — | — | 17.20 | 1.70 | 1.18 | 3.50 | 2.21 | 82.0 | 0 | — | 150 |
| 1 | — | — | 17.20 | 1.71 | 1.19 | 3.65 | 2.08 | 81.5 | −2.5 | ** | 150 |
| 2 | | 0.01 | 17.20 | 1.71 | 1.19 | 3.55 | 2.35 | 82.2 | −2.0 | ** | 150 |
| 3 | | 0.05 | 17.20 | 1.78 | 1.38 | 4.05 | 2.30 | 85.8 | +0.5 | * | 120 |
| 4 | Sodium | 0.10 | 17.25 | 1.79 | 1.42 | 4.18 | 2.35 | 85.8 | +0.9 | * | 90 |
| 5 | acetate | 1 | 17.25 | 1.80 | 1.55 | 4.75 | 2.40 | 85.9 | −1.2 | ** | 90 |
| 6 | | 3 | 17.20 | 1.82 | 1.61 | 4.65 | 2.30 | 86.5 | +1.5 | ** | 90 |
| 7 | | 5 | 17.30 | 1.83 | 1.63 | 4.80 | 2.15 | 86.7 | +1.3 | ** | 100 |
| 8 | | 10 | 17.30 | 1.78 | 1.42 | 5.10 | 2.05 | 85.5 | +0.4 | * | 120 |
| 9 | | 0.01 | 17.20 | 1.70 | 1.20 | 3.60 | 2.30 | 82.0 | −2.5 | ** | 150 |
| 10 | | 0.05 | 17.15 | 1.75 | 1.35 | 4.10 | 2.25 | 85.5 | +0.4 | * | 120 |
| 11 | Potassium | 0.10 | 17.20 | 1.77 | 1.40 | 4.15 | 2.30 | 85.7 | +0.7 | * | 90 |
| 12 | acetate | 1 | 17.30 | 1.80 | 1.57 | 4.60 | 2.25 | 86.1 | +1.1 | ** | 90 |
| 13 | | 3 | 17.25 | 1.81 | 1.60 | 4.55 | 2.30 | 86.3 | +1.2 | ** | 90 |
| 14 | | 5 | 17.30 | 1.82 | 1.62 | 4.45 | 2.10 | 86.5 | +1.0 | ** | 110 |

Table 1-continued

| Lot | Additive | Concentration (%) | Ingredient analysis values (%) | | | | | Ratio of nitrogen utilization (%) | Sensory test | | Fermentation period (days) |
|---|---|---|---|---|---|---|---|---|---|---|---|
| | | | NaCl | Total nitrogen | Glutamic acid | Reducing sugar | Alcohol | | Rating | Value | |
| 15 | | 10 | 17.25 | 1.76 | 1.38 | 4.90 | 2.08 | 85.4 | +0.3 | * | 120 |
| 16 | | 0.01 | 17.20 | 1.71 | 1.22 | 3.65 | 2.20 | 82.5 | −2.2 | ** | 150 |
| 17 | | 0.05 | 17.30 | 1.76 | 1.37 | 4.10 | 2.25 | 85.7 | +0.3 | * | 120 |
| 18 | | 0.1 | 17.20 | 1.79 | 1.59 | 3.80 | 2.25 | 85.7 | +0.8 | ** | 90 |
| 19 | Magnesium | 1 | 17.15 | 1.80 | 1.61 | 3.95 | 2.25 | 86.0 | +1.5 | ** | 90 |
| 20 | acetate | 3 | 17.15 | 1.83 | 1.65 | 4.10 | 2.20 | 86.5 | +1.2 | ** | 90 |
| 21 | | 5 | 17.30 | 1.82 | 1.65 | 4.30 | 2.10 | 86.2 | +0.8 | ** | 100 |
| 22 | | 10 | 17.30 | 1.75 | 1.41 | 4.50 | 1.85 | 85.5 | +0.3 | * | 120 |
| 23 | | 0.01 | 17.15 | 1.70 | 1.19 | 3.50 | 2.20 | 82.4 | −1.9 | ** | 150 |
| 24 | | 0.05 | 17.20 | 1.79 | 1.48 | 4.10 | 2.20 | 85.9 | +0.4 | * | 100 |
| 25 | | 0.1 | 17.15 | 1.80 | 1.53 | 4.15 | 2.15 | 86.2 | +0.4 | * | 90 |
| 26 | Calcium | 1 | 17.20 | 1.83 | 1.60 | 4.30 | 2.25 | 86.6 | +1.1 | ** | 90 |
| 27 | acetate | 3 | 17.25 | 1.85 | 1.62 | 4.30 | 2.20 | 86.7 | +0.9 | ** | 90 |
| 28 | | 5 | 17.25 | 1.82 | 1.63 | 4.45 | 2.10 | 86.1 | +0.8 | ** | 90 |
| 29 | | 10 | 17.30 | 1.77 | 1.40 | 4.65 | 1.90 | 85.3 | +0.3 | * | 100 |
| 30 | Sodium | 1 | 17.25 | 1.72 | 1.23 | 4.10 | 2.35 | 82.3 | +0.5 | * | 150 |
| 31 | carbonate | 5 | 17.30 | 1.76 | 1.40 | 4.25 | 1.65 | 85.1 | −2.5 | ** | 120 |

Similar results were obtained with sodium, potassium, magnesium, and calcium salts of formic acid, propionic acid and butyric acid.

EXPERIMENT 2

Many lots were prepared which consisted of a mixture of 0.07 kg of a koji for sake (rice koji) obtained by a conventional method of producing a sake koji and 0.18 kg of steamed rice. An aqueous solution (0.3 liter) of each of the additives indicated in Table 2 in the amounts indicated was mixed with each of the lots. Furthermore, 15 ml of a suspension (the number of living cells 2 × 10$^9$/ml) of spoiling bacteria (Hiochi bacteria; leuconostoc mesenteroides) separated from spoiled sake was added to the mixture, and the mixture was saccharified at 35° C. for 24 hours. To the resulting moromi, 0.02 liter of a cultivated liquid (the number of living cells 6.0 × 10$^8$/ml) of a yeast (Saccharomyces sake, Kyokai No. 7; IAM-4518) was added. Then, in a customary manner, an initial charge (consisting of 0.40 kg of steamed rice, 0.01 kg of rice koji and 0.38 liter of water) was fed and allowed to stand at 15° C. for 2 days. An intermediate charge (consisting of 0.86 kg of steamed rice, 0.01 kg of rice koji, and 1.08 liters of water) was then fed, and allowed to stand for 2 days at 15° C. Then, a final charge (consisting of 1.32 kg of steamed rice, 0.36 kg of rice koji and 1.90 liters of water) was fed. The system was then subjected to a usual control of moromi production at 20° C. for 21 days, and squeezed to form moromi liquids. The resulting moromi liquids were analyzed for ingredients and subjected to the sensory test. The time required until moromi liquids having substantially the same ingredient analysis values as the moromi liquid in the control lot (26 days after charging) were obtained was determined. The results are shown in Table 2.

The moromi liquid from the control lot was obtained by mixing 0.07 kg of a koji for sake, 0.18 kg of steamed rice and 0.3 liter of water, saccharifying the mixture at 35° C. for 24 hours without adding spoiling bacteria, and then subjecting the product to the same treatment as described above.

The results obtained show that the moromi liquids obtained from lot No. 1 to which a suspension of the spoiling bacteria was added in the absence of the additive of this invention, and lots Nos. 2, 9, 16 and 23 to which 0.01% of the additive of this invention was added were all spoiled, and the flavors of the moromi liquids were markedly deteriorated.

On the other hand, the moromi liquids from the lots to which the additives of this invention were added in an amount of at least 0.05% were not spoiled at all even when contaminated by the spoiling bacteria. Furthermore, the fermentation period was markedly shortened to 15 to 21 days, and the amounts of alcohol, sugars and amino acid increased by 19.3–23.5%, 4.35–6.77%, and 2.2–3.3% respectively. The sake obtained had very good taste and flavor as demonstrated by the sensory test.

Table 2

| Lot | Additive | Concentration (%) | Ingredient analysis values (%) | | | | | Sensory test | | Fermentation period (days) |
|---|---|---|---|---|---|---|---|---|---|---|
| | | | Alcohol | Total acids | Amino acids | pH | Sugars | Rating | Value | |
| Control | — | — | 19.1 | 1.7 | 1.8 | 4.6 | 3.20 | 0 | — | 26 |
| 1 | — | — | 15.2 | 3.5 | 1.9 | 4.1 | 3.05 | −2.5 | ** | 26 |
| 2 | | 0.01 | 15.9 | 3.1 | 1.8 | 4.2 | 3.15 | −1.2 | ** | 26 |
| 3 | | 0.05 | 20.8 | 1.8 | 2.5 | 4.5 | 5.00 | +0.3 | * | 20 |
| 4 | Sodium | 0.10 | 21.9 | 1.8 | 2.8 | 4.5 | 5.18 | +1.5 | ** | 16 |
| 5 | acetate | 1 | 23.5 | 1.7 | 3.0 | 4.6 | 5.32 | +1.2 | ** | 15 |
| 6 | | 3 | 22.1 | 1.6 | 3.0 | 4.6 | 6.77 | +0.5 | * | 16 |
| 7 | | 5 | 21.3 | 1.6 | 3.1 | 4.7 | 6.15 | +0.2 | — | 18 |
| 8 | | 10 | 21.1 | 1.5 | 3.3 | 4.8 | 4.35 | 0 | — | 21 |
| 9 | | 0.01 | 15.5 | 3.2 | 1.8 | 4.1 | 3.10 | −1.3 | ** | 26 |
| 10 | | 0.05 | 19.9 | 1.9 | 2.2 | 4.4 | 4.88 | +0.4 | * | 20 |
| 11 | Potassium | 0.10 | 21.0 | 1.8 | 2.7 | 4.5 | 5.08 | +1.3 | ** | 16 |
| 12 | acetate | 1 | 22.8 | 1.7 | 2.9 | 4.6 | 5.20 | +1.5 | ** | 15 |
| 13 | | 3 | 23.0 | 1.6 | 3.0 | 4.6 | 5.88 | +0.4 | * | 16 |
| 14 | | 5 | 22.1 | 1.6 | 3.2 | 4.7 | 6.02 | +0.2 | — | 20 |
| 15 | | 10 | 21.8 | 1.5 | 3.2 | 4.7 | 5.01 | +0.1 | — | 22 |
| 16 | | 0.01 | 16.0 | 3.3 | 1.9 | 4.3 | 3.30 | −1.1 | ** | 26 |
| 17 | | 0.05 | 20.2 | 1.9 | 2.6 | 4.5 | 4.55 | +0.4 | * | 20 |
| 18 | | 0.1 | 20.9 | 1.9 | 2.6 | 4.5 | 5.00 | +1.5 | ** | 16 |
| 19 | Magnesium | 1 | 21.3 | 1.7 | 2.8 | 4.6 | 5.20 | +1.3 | ** | 16 |
| 20 | acetate | 3 | 22.3 | 1.7 | 2.9 | 4.7 | 6.01 | +0.4 | * | 16 |

Table 2-continued

| Lot | Additive | Concentration (%) | Ingredient analysis values (%) | | | | | Sensory test | | Fermentation period (days) |
|---|---|---|---|---|---|---|---|---|---|---|
| | | | Alcohol | Total acids | Amino acids | pH | Sugars | Rating | Value | |
| 21 | | 5 | 19.5 | 1.5 | 3.0 | 4.7 | 5.38 | +0.2 | — | 20 |
| 22 | | 10 | 19.3 | 1.4 | 3.2 | 4.7 | 4.83 | 0 | — | 22 |
| 23 | | 0.01 | 15.7 | 3.0 | 1.7 | 4.2 | 3.27 | −1.5 | ** | 26 |
| 24 | | 0.05 | 20.0 | 1.9 | 2.4 | 4.5 | 4.70 | +0.4 | * | 21 |
| 25 | Calcium | 0.10 | 21.2 | 1.8 | 2.5 | 4.6 | 5.18 | +1.3 | ** | 16 |
| 26 | acetate | 1 | 22.3 | 1.7 | 2.8 | 4.6 | 5.80 | +1.2 | ** | 16 |
| 27 | | 3 | 22.8 | 1.6 | 3.0 | 4.6 | 6.15 | +0.6 | * | 16 |
| 28 | | 5 | 20.1 | 1.5 | 2.9 | 4.6 | 5.83 | +0.4 | * | 18 |
| 29 | | 10 | 19.3 | 1.5 | 3.2 | 4.8 | 4.66 | +0.1 | — | 21 |

Similar results were obtained with sodium, potassium, magnesium and calcium salts of formic acid, propionic acid and butyric acid.

EXPERIMENT 3

Many lots were prepared which consisted of a mixture of 0.9 kg of a koji for mirin (rice koji) obtained by a conventional method for producing koji for mirin, 5.0 kg of steamed sticky rice and 2.34 liters of 45% ethyl alcohol. Each of the additives shown in Table 3 was added in the amounts indicated to each of the lots, and 10 ml of a suspension (the number of living cells $3 \times 10^9$/ml) of spoiling bacteria (Hiochi bacteria = leuconostoc mesenteroides) separated from spoiled mirin was added to each of the mixtures. The mixture was subjected to a usual control of moromi production at 25° C. for 60 days, and squeezed. The ratio of sugar utilization and ingredient analysis values of the resulting moromi liquids were determined, and they were also subjected to the sensory test. Furthermore, the time required until moromi liquids having substantially the same ingredient analysis values as the moromi liquid in the control lot (after 60 days from the charging) were obtained was determined. The results are shown in Table 3.

The moromi liquid from the control lot was produced by subjecting a mixture of 0.9 kg of koji for mirin, 5.0 kg of steamed sticky rice and 2.34 liters of 45% ethyl alcohol to a usual control of moromi production at 25° C. for 60 days without adding the spoiling bacteria.

The results obtained show that the moromi liquids obtained from lot No. 1 to which a suspension of the spoiling bacteria was added in the absence of the additive of the invention and lots Nos. 2, 9, 16 and 23 to which 0.01% of the additive of this invention was added were all spoiled, and their flavors were markedly deteriorated.

On the other hand, the moromi liquids obtained from the lots to which at least 0.05% of the additives of this invention were added were not spoiled even when contaminated with the spoiling bacteria, and the fermentation period was shortened markedly to 40-50 days. Furthermore, the ratio of utilization of sugar increased by as much as 3.0 to 10.8%, and the amounts of amino acids and sugar also increased markedly. The mirin obtained had good taste and flavor and was full of body.

Table 3

| Lot | Additive | Concentration (%) | Ingredient analysis values (%) | | | | | Ratio of sugar utilization (%) | Sensory test | | Fermentation period (days) |
|---|---|---|---|---|---|---|---|---|---|---|---|
| | | | Baume | Alcohol | Amino acid (as glycine) | Sugars | pH | | Rating | Value | |
| Control | — | — | 19.4 | 14.5 | 0.21 | 43.5 | 5.4 | 75.3 | 0 | — | 60 |
| 1 | — | — | 18.8 | 11.7 | 0.22 | 39.5 | 4.9 | 67.7 | −2.9 | ** | 60 |
| 2 | | 0.01 | 19.0 | 12.1 | 0.21 | 40.2 | 4.9 | 69.0 | −1.0 | ** | 60 |
| 3 | | 0.05 | 19.8 | 14.6 | 0.28 | 51.3 | 5.4 | 81.1 | +0.3 | * | 50 |
| 4 | Sodium | 0.10 | 20.0 | 14.5 | 0.29 | 52.2 | 5.4 | 83.0 | +0.4 | * | 40 |
| 5 | acetate | 1 | 20.2 | 14.6 | 0.31 | 55.3 | 5.5 | 84.9 | +1.1 | ** | 40 |
| 6 | | 3 | 20.5 | 14.3 | 0.33 | 56.8 | 5.5 | 85.9 | +1.2 | ** | 40 |
| 7 | | 5 | 20.7 | 14.4 | 0.37 | 57.0 | 5.6 | 86.1 | +0.4 | * | 40 |
| 8 | | 10 | 20.9 | 14.2 | 0.30 | 50.8 | 5.7 | 80.8 | +0.3 | * | 50 |
| 9 | | 0.01 | 18.9 | 11.9 | 0.22 | 39.9 | 4.8 | 68.6 | −0.9 | ** | 60 |
| 10 | | 0.05 | 19.7 | 14.3 | 0.27 | 50.5 | 5.3 | 80.8 | +0.2 | — | 50 |
| 11 | Potassium | 0.10 | 19.8 | 14.5 | 0.29 | 51.9 | 5.4 | 82.0 | +0.4 | * | 40 |
| 12 | acetate | 1 | 19.9 | 14.5 | 0.30 | 53.5 | 5.5 | 84.1 | +0.9 | ** | 40 |
| 13 | | 3 | 20.3 | 14.4 | 0.33 | 55.8 | 5.5 | 85.7 | +1.1 | ** | 40 |
| 14 | | 5 | 20.5 | 14.6 | 0.35 | 55.9 | 5.6 | 85.9 | +0.5 | * | 40 |
| 15 | | 10 | 20.8 | 14.3 | 0.28 | 51.1 | 5.7 | 80.9 | +0.3 | * | 50 |
| 16 | | 0.01 | 18.9 | 12.0 | 0.20 | 39.8 | 4.9 | 68.0 | −1.1 | ** | 60 |
| 17 | | 0.05 | 19.7 | 14.3 | 0.28 | 49.9 | 5.2 | 80.5 | +0.3 | * | 50 |
| 18 | | 0.10 | 19.9 | 14.3 | 0.30 | 50.8 | 5.2 | 80.9 | +0.9 | ** | 40 |
| 19 | Magnesium | 1 | 19.9 | 14.3 | 0.33 | 53.3 | 5.3 | 84.0 | +1.2 | ** | 40 |
| 20 | acetate | 3 | 20.2 | 14.5 | 0.35 | 55.5 | 5.4 | 85.1 | +1.0 | ** | 40 |
| 21 | | 5 | 20.6 | 14.4 | 0.36 | 56.7 | 5.5 | 85.8 | +0.5 | * | 40 |
| 22 | | 10 | 20.8 | 14.3 | 0.29 | 51.1 | 5.6 | 80.9 | +0.3 | * | 50 |
| 23 | | 0.01 | 18.6 | 11.6 | 0.22 | 40.0 | 4.9 | 69.5 | −1.0 | ** | 60 |
| 24 | | 0.05 | 19.5 | 14.4 | 0.27 | 48.8 | 5.3 | 78.3 | +0.3 | * | 50 |
| 25 | | 0.10 | 19.7 | 14.4 | 0.29 | 51.1 | 5.4 | 80.9 | +0.5 | * | 40 |
| 26 | Calcium | 1 | 19.9 | 14.3 | 0.30 | 53.5 | 5.4 | 84.3 | +0.9 | ** | 40 |
| 27 | acetate | 3 | 20.2 | 14.4 | 0.33 | 56.0 | 5.3 | 85.9 | +1.1 | ** | 40 |
| 28 | | 5 | 20.6 | 14.5 | 0.35 | 56.3 | 5.5 | 86.0 | +0.5 | * | 40 |
| 29 | | 10 | 20.9 | 14.3 | 0.28 | 50.1 | 5.7 | 80.1 | +0.3 | * | 50 |

Similar results were obtained with sodium, potassium, magnesium and calcium salts of formic acid, propionic acid and butyric acid.

Thus, the process of this invention can completely prevent the spoilage of moromi not only in a usual moromi producing process but also at the time when the moromi is contaminated with spoiling bacteria during fermentation. It is also possible to markedly shorten the fermentation period, to greatly increase the ratio of utilization of raw materials, and to form sugar and amino acids in increased amounts in moromi. Consequently, fermented liquid food products having very good taste and flavor can be obtained.

In recent years, there has been a strong demand for soy sauce of reduced salt content by those who are obliged to take a limited amount of sodium chloride because of nephritic diseases, for example. The need has also arisen from the diversification of the mode of cooking and the taste of the general public. Production of such soy sauce by conventional methods requires very expensive aseptic fermentation apparatus or desalination apparatus.

According to the process of this invention, however, saltless soy sauce or soy sauce of reduced salt content can be easily produced by fermenting moromi in the absence of sodium chloride or in reduced sodium chloride concentrations without using such a special apparatus.

The following Examples illustrate the present invention in more detail.

EXAMPLE 1

Many lots were prepared which consisted of 80 kg of a koji for soy sauce obtained by a conventional method of producing koji for soy sauce. Then 130 liters of a 22% sodium chloride solution having dissolved therein each of the additives shown in Table 4 in the amounts indicated was mixed with each lot. The mixture was subjected to a usual control of moromi production at 30° C. for 150 days. The resulting moromi liquids were examined for the ratio of nitrogen utilization and for ingredients, and also subjected to the sensory test. The time required for fermentation was also determined. The results are shown in Table 4.

The results obtained show that in the case of the control lot to which the additive of this invention was not added, the fermentation period required was about 150 days, whereas it was only 70 to 90 days in the case of the lots to which the additives of the invention were added. Furthermore, the moromi liquids obtained from the lots in accordance with this invention showed an increase of 3.0 to 4.9% in the ratio of nitrogen utilization over the control lot, and contained markedly increased amounts of glutamic acid. The resulting soy sauce had very good taste and flavor.

Table 4

| Lot | Additive | Concentration (%) | NaCl | Total nitrogen | Glutamic acid | Reducing sugar | Alcohol | Ratio of nitrogen utilization (%) | Sensory test Rating | Sensory test Valve | Fermentation period (days) |
|---|---|---|---|---|---|---|---|---|---|---|---|
| Control | | | 17.30 | 1.71 | 1.19 | 3.48 | 2.20 | 82.2 | 0 | — | 150 |
| 1 | Sodium | 0.5 | 17.25 | 1.78 | 1.59 | 4.10 | 2.25 | 85.3 | +0.9 | ** | 90 |
| 2 | formate | 2.0 | 17.20 | 1.89 | 1.62 | 4.05 | 2.15 | 86.5 | +0.3 | * | 75 |
| 3 | Potassium | 0.5 | 17.25 | 1.78 | 1.58 | 4.00 | 2.20 | 85.5 | +0.8 | ** | 90 |
| 4 | formate | 2.0 | 17.20 | 1.82 | 1.60 | 4.20 | 2.20 | 87.0 | +0.3 | * | 75 |
| 5 | Magnesium | 0.5 | 17.20 | 1.79 | 1.55 | 4.65 | 2.25 | 85.6 | +1.0 | ** | 90 |
| 6 | formate | 2.0 | 17.20 | 1.83 | 1.59 | 4.70 | 2.20 | 86.8 | +0.4 | * | 75 |
| 7 | Calcium | 0.5 | 17.20 | 1.80 | 1.60 | 4.80 | 2.50 | 86.0 | +1.0 | ** | 90 |
| 8 | formate | 2.0 | 17.15 | 1.83 | 1.61 | 4.80 | 2.15 | 86.2 | +0.3 | * | 75 |
| 9 | Sodium | 0.5 | 17.20 | 1.80 | 1.61 | 4.50 | 2.30 | 86.0 | +2.5 | ** | 90 |
| 10 | acetate | 2.0 | 17.15 | 1.88 | 1.67 | 4.35 | 2.15 | 87.1 | +2.0 | ** | 70 |
| 11 | Potassium | 0.5 | 17.20 | 1.80 | 1.60 | 4.40 | 2.50 | 86.1 | +2.3 | ** | 90 |
| 12 | acetate | 2.0 | 17.10 | 1.86 | 1.65 | 4.35 | 2.20 | 86.8 | +1.8 | ** | 70 |
| 13 | Magnesium | 0.5 | 17.25 | 1.78 | 1.60 | 4.30 | 2.40 | 85.8 | +1.8 | ** | 90 |
| 14 | acetate | 2.0 | 17.15 | 1.83 | 1.63 | 4.20 | 2.10 | 86.2 | +2.0 | ** | 70 |
| 15 | Calcium | 0.5 | 17.20 | 1.79 | 1.61 | 4.25 | 2.35 | 85.9 | +1.5 | ** | 90 |
| 16 | acetate | 2.0 | 17.15 | 1.84 | 1.63 | 4.30 | 2.15 | 86.5 | +1.5 | ** | 70 |
| 17 | Sodium | 0.5 | 17.20 | 1.80 | 1.59 | 4.50 | 2.25 | 86.1 | +1.0 | ** | 90 |
| 18 | propionate | 2.0 | 17.20 | 1.87 | 1.67 | 4.75 | 2.20 | 87.0 | +0.8 | ** | 70 |
| 19 | Potassium | 0.5 | 17.20 | 1.78 | 1.55 | 4.45 | 2.30 | 85.5 | +1.0 | ** | 90 |
| 20 | propionate | 2.0 | 17.15 | 1.86 | 1.67 | 4.50 | 2.15 | 86.8 | +0.9 | ** | 70 |
| 21 | Magnesium | 0.5 | 17.25 | 1.77 | 1.55 | 4.35 | 2.25 | 85.3 | +0.9 | ** | 90 |
| 22 | propionate | 2.0 | 17.20 | 1.85 | 1.65 | 4.35 | 2.25 | 86.6 | +0.9 | ** | 70 |
| 23 | Calcium | 0.5 | 17.30 | 1.82 | 1.60 | 4.60 | 2.20 | 86.0 | +1.3 | ** | 90 |
| 24 | propionate | 2.0 | 17.30 | 1.87 | 1.68 | 4.50 | 2.15 | 86.8 | +1.1 | ** | 70 |
| 25 | Sodium | 0.5 | 17.25 | 1.77 | 1.60 | 4.30 | 2.25 | 85.3 | +0.9 | ** | 90 |
| 26 | butyrate | 2.0 | 17.30 | 1.83 | 1.62 | 4.10 | 2.00 | 86.1 | +0.3 | * | 75 |
| 27 | Potassium | 0.5 | 17.25 | 1.77 | 1.58 | 4.15 | 2.20 | 85.2 | +0.8 | ** | 90 |
| 28 | butyrate | 2.0 | 17.15 | 1.82 | 1.61 | 4.00 | 1.95 | 86.1 | +0.3 | * | 75 |
| 29 | Magnesium | 0.5 | 17.20 | 1.80 | 1.59 | 4.25 | 2.30 | 86.0 | +0.9 | ** | 90 |
| 30 | butyrate | 2.0 | 17.10 | 1.81 | 1.59 | 4.10 | 2.10 | 86.3 | +0.3 | * | 75 |
| 31 | Calcium | 0.5 | 17.25 | 1.78 | 1.55 | 4.10 | 2.25 | 85.3 | +0.9 | ** | 90 |
| 32 | butyrate | 2.0 | 17.10 | 1.82 | 1.60 | 4.15 | 2.10 | 86.5 | +0.4 | * | 75 |

EXAMPLE 2

Many lots were prepared which consisted of a mixture of 0.7 kg of a koji for sake (rice koji) obtained by a conventional method of producing koji for sake and 1.8 kg of steamed rice. Then, 3 liters of an aqueous solution containing each of the additives shown in Table 5 in the amounts indicated was mixed with each of the lots. The mixture was saccharified at 40° C. for 24 hours. To the resulting moromi was added 0.2 liter of a culture liquid (the number of living cells $7.5 \times 10^8$/ml) of a yeast (Saccharomyces sake, Kyokai No. 7; IAM-4518). In a customary manner, an initial charge (consisting of 4 kg of steamed rice, 0.1 kg of a rice koji and 3.8 liters of water) was fed and allowed to stand at 15° C. for 2 days. Then, an intermediate charge (consisting of 8.6 kg of steamed rice, 0.1 kg of a rice koji and 10 liters of water) was fed, and allowed to stand at 15° C. for 2 days. A final charge (consisting of 13 kg of steamed rice, 3.5 kg of a rice koji and 18 liters of water) was fed, and the system was subjected to a usual control of moromi production at 20° C. for 21 days. The resulting moromi liquids were examined for ingredients, and also subjected to the sensory test. The time required for fermentation was also determined. The results are shown in Table 5.

The results show that the control lot not containing the additive of this invention required a period of about 26 days for fermentation, whereas the lots containing the additives of the invention reached the same degree of fermentation as the control lot in about 16 to 20 days. Moreover, the amounts of sugar and alcohol produced in the moromi liquids in accordance with the invention showed an increase of as much as 1.75 to 3.45%, and 1.9 to 4.3% respectively, and the amounts of amino acids such as glycine also increased markedly. The resulting sake products had good flavor and quality.

cated in Table 6 in the amounts indicated. The mixture was subjected to a usual control of moromi production at 25° C. for 60 days, and squeezed. The resulting moromi liquids were examined for the ratio of utilization of sugar and for ingredients, and also subjected to the sensory test. The time required for fermentation was also determined. The results are shown in Table 6.

The results obtained show that the control lot not containing the additive of the invention required about 60 days for fermentation, whereas the lots containing the additives of the invention reached the same degree Table 5

| Lot | Additive | Concentration (%) | Ingredient analysis values (%) | | | | | Sensory test | | Fermentation period (days) |
|---|---|---|---|---|---|---|---|---|---|---|
| | | | Alcohol | Total acids | Amino acids | pH | Sugars | Rating | Value | |
| Control | — | — | 19.0 | 1.8 | 1.8 | 4.6 | 3.05 | 0 | — | 26 |
| 1 | Sodium | 0.5 | 22.2 | 1.7 | 2.5 | 4.6 | 4.85 | +0.9 | ** | 20 |
| 2 | formate | 2.0 | 22.0 | 1.6 | 2.8 | 4.7 | 4.95 | +0.3 | * | 20 |
| 3 | Potassium | 0.5 | 21.8 | 1.6 | 2.4 | 4.6 | 4.80 | +0.9 | ** | 20 |
| 4 | formate | 2.0 | 21.3 | 1.6 | 2.7 | 4.6 | 4.85 | +0.3 | * | 20 |
| 5 | Magnesium | 0.5 | 21.5 | 1.7 | 2.3 | 4.6 | 4.90 | +0.9 | ** | 20 |
| 6 | formate | 2.0 | 21.0 | 1.6 | 2.5 | 4.6 | 4.95 | +0.3 | * | 20 |
| 7 | Calcium | 0.5 | 21.4 | 1.6 | 2.5 | 4.6 | 4.90 | +0.8 | ** | 20 |
| 8 | formate | 2.0 | 21.3 | 1.6 | 2.5 | 4.6 | 4.85 | +0.4 | * | 20 |
| 9 | Sodium | 0.5 | 23.0 | 1.7 | 2.9 | 4.6 | 5.50 | +1.5 | ** | 16 |
| 10 | acetate | 2.0 | 22.5 | 1.6 | 3.0 | 4.7 | 6.50 | +1.1 | ** | 16 |
| 11 | Potassium | 0.5 | 22.8 | 1.6 | 2.8 | 4.6 | 5.30 | +1.1 | ** | 16 |
| 12 | acetate | 2.0 | 22.2 | 1.5 | 3.0 | 4.7 | 6.15 | +0.9 | ** | 16 |
| 13 | Magnesium | 0.5 | 22.5 | 1.6 | 2.7 | 4.5 | 5.05 | +0.9 | ** | 16 |
| 14 | acetate | 2.0 | 21.9 | 1.6 | 2.7 | 4.6 | 5.85 | +0.9 | ** | 16 |
| 15 | Calcium | 0.5 | 22.6 | 1.7 | 2.8 | 4.6 | 5.15 | +2.2 | ** | 16 |
| 16 | acetate | 2.0 | 22.0 | 1.6 | 3.0 | 4.6 | 5.90 | +1.3 | ** | 16 |
| 17 | Sodium | 0.5 | 23.3 | 1.7 | 2.9 | 4.6 | 5.40 | +1.3 | ** | 16 |
| 18 | propionate | 2.0 | 23.1 | 1.7 | 3.1 | 4.7 | 6.35 | +1.1 | ** | 16 |
| 19 | Potassium | 0.5 | 22.8 | 1.7 | 2.7 | 4.6 | 5.30 | +1.0 | ** | 16 |
| 20 | propionate | 2.0 | 22.6 | 1.6 | 3.0 | 4.6 | 6.10 | +0.9 | ** | 16 |
| 21 | Magnesium | 0.5 | 22.1 | 1.7 | 2.6 | 4.6 | 5.30 | +0.9 | ** | 16 |
| 22 | propionate | 2.0 | 21.8 | 1.6 | 2.8 | 4.7 | 5.85 | +0.9 | ** | 16 |
| 23 | Calcium | 0.5 | 22.2 | 1.7 | 2.9 | 4.6 | 5.25 | +0.9 | ** | 16 |
| 24 | propionate | 2.0 | 21.9 | 1.5 | 3.0 | 4.6 | 5.75 | +0.9 | ** | 16 |
| 25 | Sodium | 0.5 | 21.2 | 1.8 | 2.4 | 4.6 | 4.90 | +0.9 | ** | 18 |
| 26 | butyrate | 2.0 | 21.0 | 1.7 | 2.7 | 4.7 | 5.15 | +0.3 | * | 20 |
| 27 | Potassium | 0.5 | 21.2 | 1.7 | 2.4 | 4.6 | 4.90 | +0.9 | ** | 18 |
| 28 | butyrate | 2.0 | 21.1 | 1.7 | 2.5 | 4.8 | 5.00 | +0.3 | * | 20 |
| 29 | Magnesium | 0.5 | 21.0 | 1.7 | 2.3 | 4.6 | 5.00 | +0.8 | ** | 18 |
| 30 | butyrate | 2.0 | 21.0 | 1.6 | 2.4 | 4.6 | 5.10 | +0.3 | * | 20 |
| 31 | Calcium | 0.5 | 20.9 | 1.6 | 2.4 | 4.6 | 4.90 | +1.0 | ** | 18 |
| 32 | butyrate | 2.0 | 21.0 | 1.6 | 2.5 | 4.6 | 5.10 | +0.4 | * | 20 |

EXAMPLE 3

Many lots were prepared which consisted of 9 kg of a koji for mirin (rice koji), 50 kg of steamed sticky rice and 23 liters of 45% ethyl alcohol. To each of the lots was added each of the additives of the invention indicated in Table 6 in the amounts indicated. The mixture of fermentation as the control lot in only 40 to 45 days. Furthermore, the ratio of sugar utilization showed an increase of as much as 8.1 to 11.1% over the control lot. The amounts of amino acids and sugar also increased. The resulting mirin products had improved quality and very good taste and flavor.

Table 6

| Lot | Additive | Concentration (%) | Ingredient analysis values (%) | | | | | Ratio of sugar utilization (%) | Sensory test | | Fermentation period (days) |
|---|---|---|---|---|---|---|---|---|---|---|---|
| | | | Baume | Alcohol | Amino acid (as glycine) | Sugars | pH | | Rating | Value | |
| Control | — | — | 19.1 | 14.0 | 0.20 | 41.1 | 5.3 | 75.0 | 0 | — | 60 |
| 1 | Sodium | 0.5 | 20.1 | 14.0 | 0.28 | 51.1 | 5.3 | 83.3 | +0.9 | ** | 45 |
| 2 | formate | 2.0 | 20.2 | 13.8 | 0.30 | 52.5 | 5.4 | 85.0 | +0.3 | * | 40 |
| 3 | Potassium | 0.5 | 20.0 | 14.1 | 0.28 | 51.0 | 5.3 | 83.1 | +0.8 | ** | 45 |
| 4 | formate | 2.0 | 20.2 | 13.9 | 0.29 | 52.2 | 5.3 | 84.4 | +0.3 | * | 40 |
| 5 | Magnesium | 0.5 | 20.0 | 14.0 | 0.29 | 50.8 | 5.3 | 83.0 | +0.8 | ** | 45 |
| 6 | formate | 2.0 | 20.2 | 14.1 | 0.29 | 51.8 | 5.4 | 84.1 | +0.3 | * | 40 |
| 7 | Calcium | 0.5 | 20.0 | 13.9 | 0.29 | 51.3 | 5.4 | 83.5 | +0.9 | ** | 45 |
| 8 | formate | 2.0 | 20.3 | 13.9 | 0.31 | 51.8 | 5.4 | 84.0 | +0.8 | ** | 40 |
| 9 | Sodium | 0.5 | 20.5 | 14.1 | 0.32 | 55.3 | 5.3 | 85.5 | +1.1 | ** | 40 |
| 10 | acetate | 2.0 | 20.9 | 14.0 | 0.35 | 56.0 | 5.3 | 85.9 | +1.0 | * | 40 |
| 11 | Potassium | 0.5 | 20.4 | 14.0 | 0.31 | 55.0 | 5.3 | 85.1 | +1.0 | ** | 40 |
| 12 | acetate | 2.0 | 20.8 | 13.9 | 0.34 | 55.5 | 5.4 | 85.7 | +0.9 | ** | 40 |
| 13 | Magnesium | 0.5 | 20.4 | 13.9 | 0.31 | 54.8 | 5.3 | 84.9 | +0.9 | ** | 40 |
| 14 | acetate | 2.0 | 20.5 | 13.9 | 0.32 | 54.9 | 5.5 | 85.1 | +0.9 | ** | 40 |
| 15 | Calcium | 0.5 | 20.5 | 13.9 | 0.31 | 55.0 | 5.4 | 85.2 | +1.1 | ** | 40 |
| 16 | acetate | 2.0 | 20.6 | 13.9 | 0.33 | 55.3 | 5.4 | 85.4 | +1.0 | ** | 40 |
| 17 | Sodium | 0.5 | 20.2 | 13.9 | 0.33 | 55.6 | 5.3 | 85.8 | +1.5 | ** | 40 |
| 18 | propionate | 2.0 | 20.5 | 13.9 | 0.36 | 55.9 | 5.3 | 86.1 | +1.3 | ** | 40 |
| 19 | Potassium | 0.5 | 20.2 | 14.0 | 0.33 | 55.3 | 5.3 | 85.7 | +1.6 | ** | 40 |
| 20 | propionate | 2.0 | 20.4 | 13.9 | 0.35 | 55.5 | 5.4 | 85.9 | +1.5 | ** | 40 |

Table 6-continued

| | | Concentration | Ingredient analysis values (%) | | | | | Ratio of sugar utilization | Sensory test | | Fermentation period |
|---|---|---|---|---|---|---|---|---|---|---|---|
| Lot | Additive | (%) | Baume | Alcohol | Amino acid (as glycine) | Sugars | pH | (%) | Rating | Value | (days) |
| 21 | Magnesium | 0.5 | 20.2 | 14.1 | 0.31 | 55.1 | 5.3 | 85.6 | +1.0 | ** | 40 |
| 22 | propionate | 2.0 | 20.3 | 14.0 | 0.33 | 55.4 | 5.4 | 85.8 | +0.9 | ** | 40 |
| 23 | Calcium | 0.5 | 20.1 | 14.1 | 0.32 | 55.2 | 5.4 | 85.6 | +1.5 | ** | 40 |
| 24 | propionate | 2.0 | 20.8 | 14.1 | 0.33 | 55.6 | 5.4 | 85.9 | +1.5 | ** | 40 |
| 25 | Sodium | 0.5 | 20.3 | 14.0 | 0.29 | 53.3 | 5.3 | 84.8 | +0.9 | ** | 45 |
| 26 | butyrate | 2.0 | 20.4 | 14.2 | 0.31 | 53.8 | 5.3 | 84.9 | +0.3 | * | 40 |
| 27 | Potassium | 0.5 | 20.2 | 13.9 | 0.28 | 52.9 | 5.3 | 84.5 | +0.8 | ** | 45 |
| 28 | butyrate | 2.0 | 20.3 | 14.00 | 0.30 | 52.9 | 5.5 | 84.6 | +0.3 | * | 40 |
| 29 | Magnesium | 0.5 | 20.1 | 14.1 | 0.27 | 52.8 | 5.4 | 83.9 | +0.8 | ** | 45 |
| 30 | butyrate | 2.0 | 20.3 | 14.1 | 0.28 | 53.3 | 5.4 | 84.0 | +0.3 | * | 40 |
| 31 | Calcium | 0.5 | 20.0 | 14.0 | 0.29 | 53.0 | 5.5 | 84.2 | +1.0 | ** | 45 |
| 32 | butyrate | 2.0 | 20.3 | 13.9 | 0.30 | 53.8 | 5.5 | 84.5 | +0.8 | ** | 40 |

What we claim is:

1. In a process for producing a fermented liquid food product by fermenting a moromi which comprises a koji for the fermented liquid food product, a moromi substrate and a liquid including at least one member selected from the group consisting of brine, alcohol and water at a temperature of about 10° to about 40° C. for a time sufficient to produce the fermented liquid food product; the improvement wherein the fermentation is carried out in the presence of about 0.05 to about 10% by weight, based on the total weight of the koji and moromi substrate, of an added metal salt selected from the group consisting of potassium salts, sodium salts, calcium salts and magnesium salts of aliphatic carboxylic acids containing up to 4 carbon atoms.

2. The process of claim 1 wherein the aliphatic carboxylic acid is acetic acid.

3. The process of claim 1 wherein the aliphatic carboxylic acid is propionic acid.

4. The process of claim 1 wherein the moromi is a moromi for soy sauce and contains up to 20% by weight, based on the weight of the moromi, of sodium chloride.

5. The process of claim 1 wherein the moromi is a moromi for soy sauce and the amount of the added metal salt is about 0.1 to 5% by weight, based on the total weight of koji and the moromi substrate.

6. The process of claim 1 wherein the moromi is a moromi for sake or mirin, and the amount of the added metal salt is about 0.05 to 8% by weight, based on the total weight of the koji and moromi substrate.

7. The process of claim 6 wherein the amount of the added metal salt is about 0.1 to about 3% by weight, based on the total weight of the koji and moromi substrate.

8. The process of claim 2 wherein the metal salt is the potassium or sodium salt of acetic acid.

9. The process of claim 3 wherein the metal salt is the potassium or sodium salt of propionic acid.

* * * * *